United States Patent [19]

Crook, Jr.

[11] 3,741,600
[45] June 26, 1973

[54] SAFETY HOOK
[75] Inventor: Edward J. Crook, Jr., Fort Wayne, Ind.
[73] Assignee: American Hoist & Derrick Company, St. Paul, Minn.
[22] Filed: July 30, 1971
[21] Appl. No.: 167,371

[52] U.S. Cl. ................... 294/82 R, 24/241 SB
[51] Int. Cl. .................................. B66c 1/36
[58] Field of Search ......... 294/82 R, 83 R, 241 PP; 24/241 P, 241 PS, 241 TC, 241 SB, 241 PL; 59/85

[56] References Cited
UNITED STATES PATENTS
| 2,864,644 | 12/1958 | Marryatt | 294/83 R |
| 2,927,358 | 3/1960 | Ratcliff | 24/241 PS |
| 3,453,822 | 7/1969 | Crook, Jr. | 59/85 |

Primary Examiner—Evon C. Blunk
Assistant Examiner—Johnny D. Cherry
Attorney—Burd, Braddock & Bartz

[57] ABSTRACT

A hoisting hook carries an end loop of a load bearing line and has an eye, a curved hook with a hook tip spaced from the eye to form a throat therebetween, and a throat closure device in the form of a safety gate pivotally mounted for rotation about the eye of the hook. The gate has a bridging arm portion which, in closed relation, extends from the eye of the hook to the top of the hook across the hook throat and a connecting arm portion which extends upwardly from the eye of the hook to provide a gate eye to receive a hoisting line. When the end loop of the load bearing line is on the hook and the hook and gate combination is loaded, the load on the hook will tend to cause the bridging arm portion of the gate to close on the tip of the hook and to remain in a closed position. A self-locking latch is pivotally mounted entirely within the gate for movement between locking and release positions. The configuration of the bridging arm portion is such that it is extremely unlikely or impossible for the load line end loop to move off of encircling relation to the hook whether the load line is slack or loaded and when the hook is bridged. The safety gate can be rotated clear of the hook throat to provide virtually the entire throat dimension for receiving the edge of flat sheet or plate material or the like.

4 Claims, 7 Drawing Figures

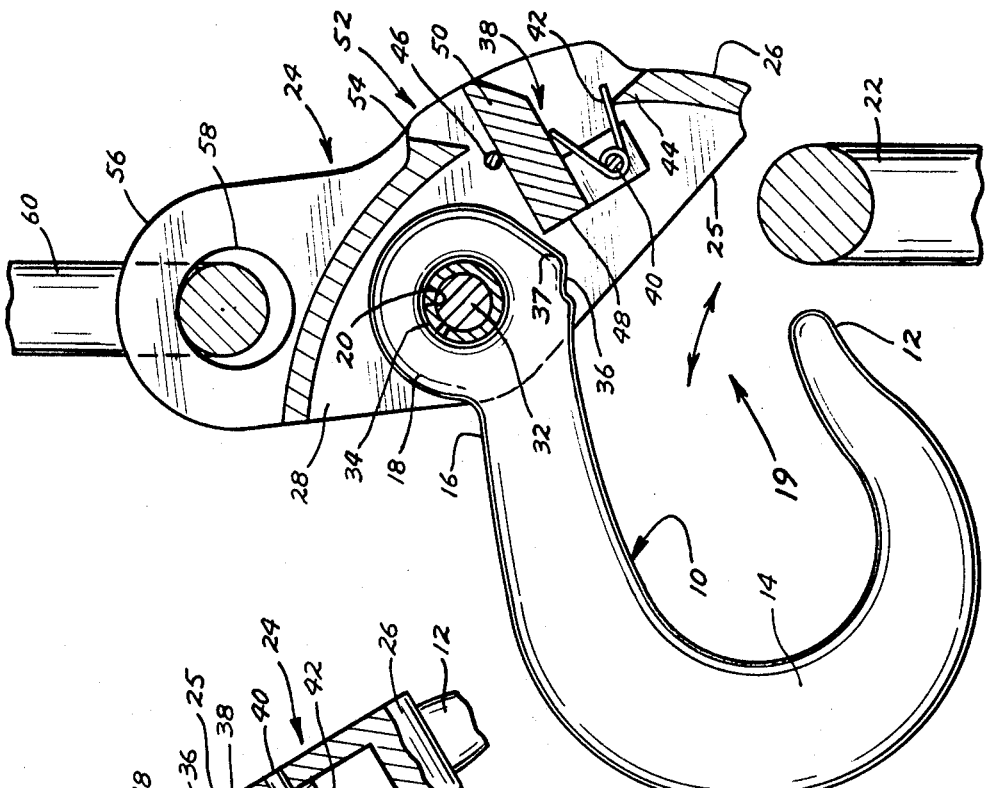
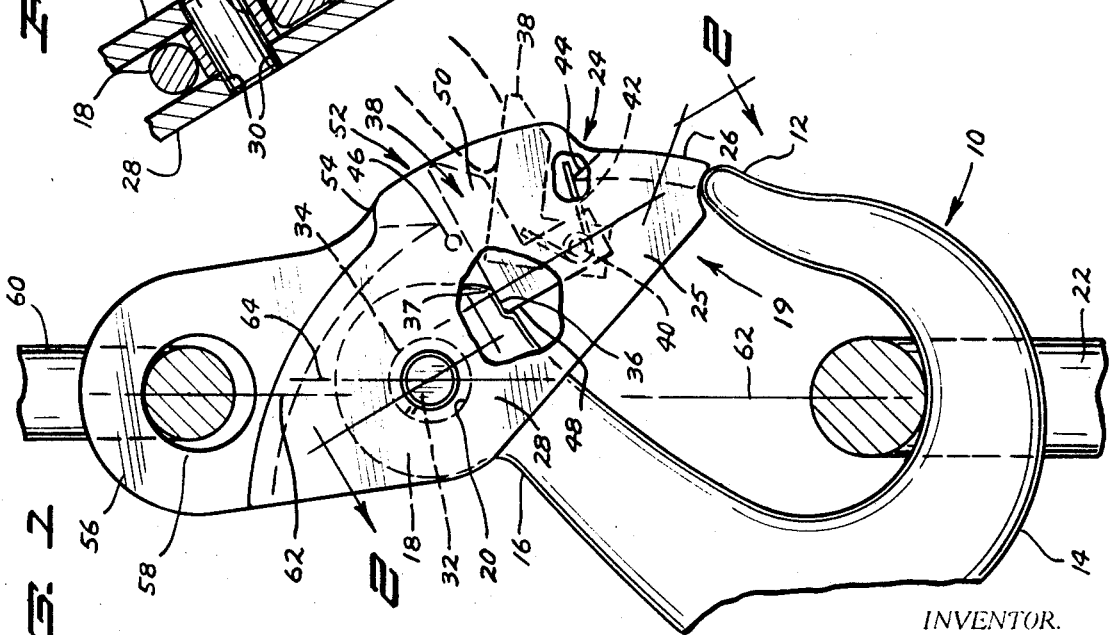

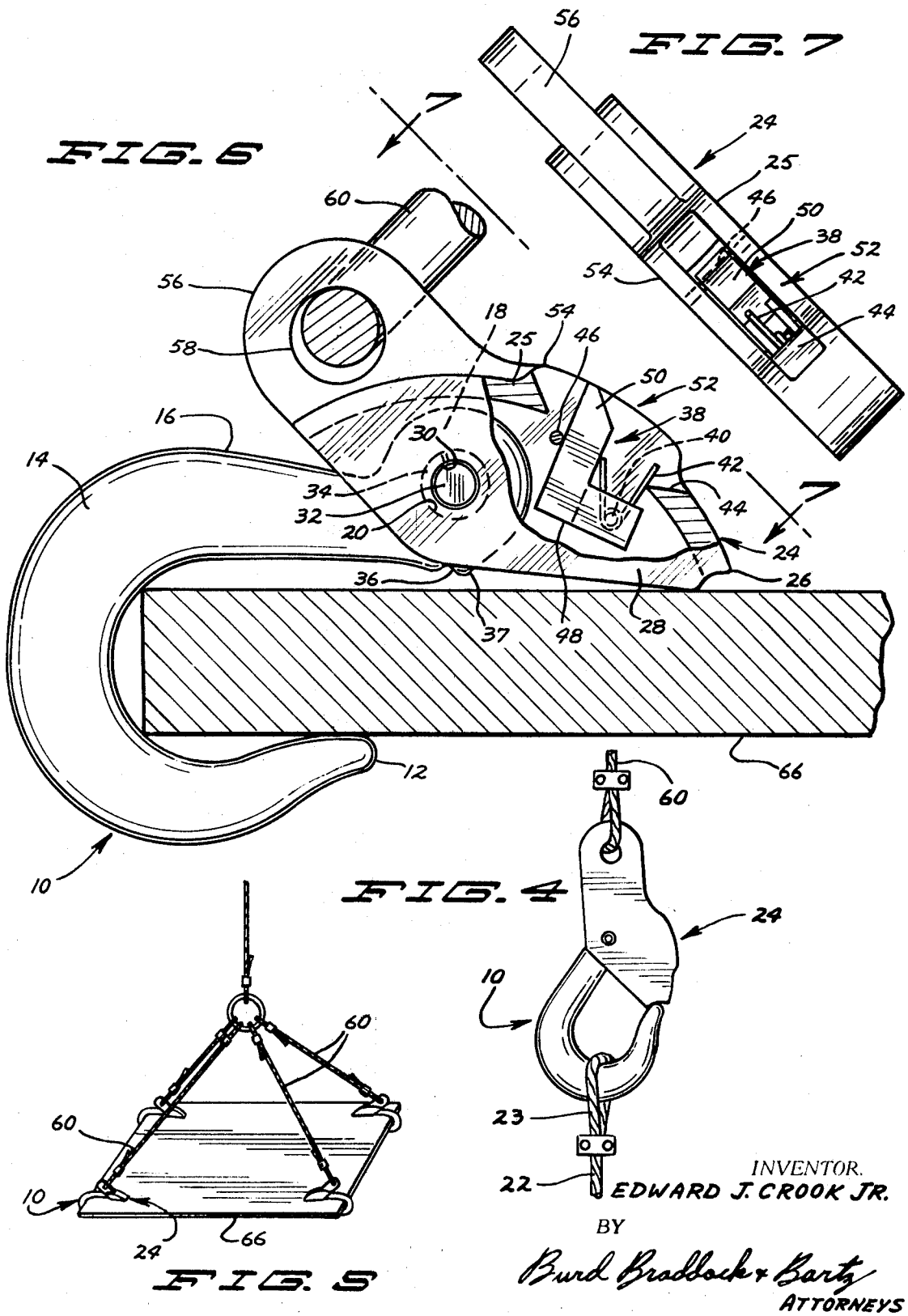

SAFETY HOOK

BACKGROUND OF THE INVENTION

This invention relates to a hoisting hook carrying an end loop of a load bearing line and a safety gate pivotally mounted to the hoisting hook and shaped to retain the load line end loop on the hook whether the load line is taut or slack. The safety gate is self-closing under load and includes a non-loaded latch pivotally mounted in a throat bridging arm portion of the gate. The latch is biased into position to engage a raised shoulder on the hook eye so that the gate cannot rotate when the latch is in its latched position. The safety gate and hoisting hook combination may also be used in an open position for lifting sheet material and the like. In addition to preventing the load line from accidentally coming off the hook, a major function of a safety hook is to prevent fouling of the load line when the load line is slack thus to insure against failure of or damage to the safety hook and/or load line when load is again applied through the hook to the load line. Many of the safety hooks of the prior art are shaped so that the end loop of a load line, being relatively stiff, can ride up from encircling relation to the hook itself and into encircling relation with the safety gate. This can bring the lifting forces to bear on the safety gate, which are usually not built to take the full lifting forces; and/or on the latch mechanism or protruding latch trigger arm. This can cause the latch to fail, making it inoperative and sometimes resulting in separation of the load line from the safety hook assembly.

Prior art structures subject to such problems include those shown in the following U.S. Pat. Nos. 3,114,955; 3,038,753; 2,927,358; and 2,706,318. For example, in the patent to Radcliff, as seen in FIGS. 1 and 3, when the load line is slack, as where the hook is resting on the ground with an end loop of a load line "trapped" on the hook, that loop will work off the hook body 3 to have position around the arms 9 of the safety gate 8, and between the hook shank 4 and latch handle end 29. Then when a lifting force is applied to shank 4, all the weight on the load line will be brought to bear on the arms 9 of the gate and on the latch handle 29. The structure does not have the strength of the hook and failure must result.

Another requirement of a safety hook is that the structural strength of the hook including the hook eye be maintained while providing a positive locking mechanism to prevent accidental opening of the safety gate and loss of contact with load bearing line. U.S. Pat. No. 1,956,786 to W. J. Bemis shows a combination hook and closure member arrangement; but depressions 20 and 21 weaken and provide stress points in the hook eye 4. No provision is made for a positive locking mechanism. Also, as shown in FIG. 3 of that patent, the maximum opening and exposure of the hook throat permitted by the movement of the closure member does not allow for use of the entire throat and body portion of the hook and so does not allow for a secure gripping action on the edge of a plate member, or the like, by the hook.

U.S. Pat. No. 3,114,955 to B. D. Ahlquist shows an arrangement having an arm portion for lockingly engaging the hook to insure entrapment of a load bearing line, but edge portions of plates or sheets cannot be received by this hook.

Various locks are known for use with different types of safety hooks. See, for example, U.S. Pat. No. 2,927,358 to Radcliff; No. 2,706,318 to Coffing; No. 1,532,927 to Nowland; and No. 1,505,051 to Lindgren. These all have the disadvantage of weakening of structural strength because of parts notched to receive a boss of some kind. Further, none can be used both as a hoisting hook for a load bearing line and to provide a completely open hook throat to receive the edges of plate material or the like.

It is often desirable to remove the safety gate and use the hook alone. A method of conveniently and separably interlocking and disconnecting the parts is shown in my U.S. Pat. No. 3,453,822.

SUMMARY OF THE INVENTION

A safety gate depends from a hoisting line and is pivotally mounted to a hoisting hook through an eye of the hook for rotation between a closed position wherein a throat bridging arm portion of the gate is in blocking relation across the throat of the hook and an open position wherein said bridging arm is clear of alignment with the hook throat. In one manner of normal usage, a closed end loop of a load bearing line depends from the hook. A load axis will then extend from the center of the hoisting line to the center of the load bearing line. The pivotal connection between the safety gate and the hoisting hook is displaced from the load axis in direction toward the tip of the hook so that the load on the safety gate and hook combination will tend to cause the gate bridging arm to close against the tip of the hook and to forcefully maintain the closure relationship.

The configuration of the throat bridging arm of the gate in dimension in the plane of the hook body is such that a closed end loop of a load bearing line of convenient size to extend over the hook will fit over the bridging arm only with great difficulty or not at all.

A latch is pivotally mounted entirely within the hook throat bridging arm portion of the gate and is normally biased into position to engage a shoulder extending from the hoisting hook eye. Once the gate is closed, this latch engages the shoulder so that the gate cannot rotate from the closed position when the latch is in the latch position. The latch is manually movable into clearing relationship with the hook eye shoulder thus to allow free rotation of the gate for bringing the throat bridging arm portion of the gate into clearing relationship with the throat of the hook.

With the safety gate in the fully open position, full access to the throat of the hook is provided so that the hook may be engaged with plates or sheets of material, beams, or pipe on which there are no eyes or loops for the hook attachment. With the safety gate and hook combination in engagement with a plate, for example, the load weight applied to the combination safety gate and hoisting hook is such that a frictional gripping engagement is provided between the end segment of the gate on top of the plate and the tip portion of the hook on the bottom of the plate with the load bearing body portion of the hook encompassing the edge portion of the plate so that the gripping pressure increases with the weight of the load. The thickness of the plate which can be so handled is roughly commensurate with the full throat dimension.

So that the safety gate can be removed from the hook, the pivotal connection between them consists of a coupling pin of uniform diameter which extends through holes in parallel facing side plates of the safety gate and through a resilient, longitudinally split locking sleeve of nominally smaller inside diameter than the outside diameter of the pin, the locking sleeve being situated inside the eye of the hook between the side plates and the sleeve thus situated having an outer diameter which is slightly less than the inner diameter of the hook eye.

IN THE DRAWINGS

FIG. 1 is a side elevational view of a safety hook combination of the present invention, shown in the closure relationship with portions broken away, with a safety gate supported vertically from a hoisting line and with a load bearing line attached to the hook;

FIG. 2 is a cross sectional view along lines 2—2 of FIG. 1;

FIG. 3 is a side view of the structure of FIG. 1 in the partially open position with portions of the safety gate in cross section;

FIG. 4 is a side elevational view of the hook as seen in FIG. 1, and showing the relationship of a closed end loop in the load line to the hook;

FIG. 5 is a semi-diagrammatic perspective view of a plurality of combination safety gates and hoisting hooks according to the present invention engaged with a plate or sheet of material for lifting same;

FIG. 6 is a side elevational view of one of the safety gates and hoisting hook combinations shown in FIG. 5 and according to the structure of FIG. 1 in gripping engagement with a plate and having portions of the safety gate surrounding the latch broken away; and FIG. 7 is a top plan of a portion of the safety gate of FIG. 6 as seen along line 7—7 of FIG. 5.

DESCRIPTION OF THE PREFERRED EMBODIMENT

Referring to the figures, a hoisting hook 10 is formed with a tip 12 which extends into a curving load bearing body portion 14, which curves around in a semicircular fashion and extends into a weight supporting shank segment 16. The shank segment 16 widens into an enlarged eye 18 having an opening 20 therethrough. The space between the eye 18 and the tip 12 is designated as throat opening or throat 19. In FIG. 1, a load bearing link or line 22, partially shown, for supporting a load (not shown) is supported in the curving load bearing body portion 14 of the hook. In FIG. 4, a closed end loop 23 is shown as the outward end portion of load line 22.

A safety gate, generally designated 24, is pivotally mounted to the hoisting hook 10 for rotational movement between an open position allowing clear and complete access to the throat opening 19 of the hook and a closed position bridging the throat opening of the hook. The safety gate has a throat bridging arm portion 25 which includes an end segment 26 formed to mate with the tip 12 of the hoisting hook. The safety gate includes a pair of side plates 28,28 which surround the eye 18 of the hook. Formed in the side plates 28,28 are holes 30,30 which form coaxial openings with the eye 20 of the hook but which have a smaller diameter.

Pin 32 is held in locking engagement with the side plates of the safety gate and with the eye of the hook by a resilient, longitudinally split locking sleeve 34. The sleeve 34 is normally biased to a smaller inside diameter than the diameter of the pin so that the pin is clamped as it is driven through one of the holes 30, into the sleeve and through the other of the holes 30. The locking sleeve is larger than the holes 30,30 in the side plates and will not pass therethrough, so that it is held in the eye of the hook and between the side plates. The pin does not then project beyond outside edge surfaces of these side plates 28,28.

A shoulder 36 is built up on the eye 18 of the hook and faces generally outwardly in the direction of the throat 19. By positioning this shoulder as part of an extended portion of the eye 18 rather than providing a notch in the narrower shank segment 16, the load bearing cross sectional area of the hook is not reduced so as to cause a stress point or otherwise limit the strength of the hook. A latch 38 is pivotally mounted entirely within the throat bridging arm portion 25 of the gate between the side plates 28,28 on a latch pivot pin 40 which is supported by the side plates. A latch spring 42 is engaged between the latch and a stop 44 formed in the end segment 26 of the bridging arm portion of the gate to bias the latch towards the locking position in which the latch is engaged with the shoulder 36 in the hook, as shown in FIG. 1. When not engaged with the shoulder 36, the latch rests against a stop pin 46 which is supported between the side plates 28,28 of the safety gate. As the bridging arm portion of the safety gate is rotatably closed upon the tip of the hook, blocking the throat, a corner portion 48 of the latch rides over a boss 37 formed as part of the eye of the hook and lockingly engages with the shoulder 36.

The latch includes an actuating arm 50 extending outwardly into an opening 52 formed in an enlarged and elongated boss 54 on the outer surface of side plates 28,28 of the bridging arm portion of the safety gate. In order to prevent accidental unlocking of the latch, the actuating arm of the latch, in this preferred form of the invention, does not extend beyond the boss 54 when in a locked position. An operator must insert his finger or a tool into an opening 52 between the side plates on the safety gate in order to dislodge the latch and unlock the gate, as indicated in dotted lines in FIG. 1.

In order to prevent a closed end loop of the load line from accidentally becoming dislodged from the hook 10 and instead encircling the bridging arm 25, the transverse dimension of the bridging arm including boss 54 across the hook throat and in the plane of the hook 10 is roughly commensurate with the throat dimension between the hook eye 18 and the tip 12.

The safety gate 24 includes an upstanding connecting arm portion 56 extending from the pivotal mounting with the hook eye and including portions of the side plates 28,28. Connecting arm 56 includes an eye 58 at the upper portion thereof for engagement with a hoisting line or link 60, partially shown. The entire outer periphery of the safety gate and hook combination when the gate is closed is smooth and regular so as not to present a surface where either the hoisting line 60 or the load line 22 can catch.

As shown in FIG. 1, a draftsman's construction line extends from the center of the hoisting line 60 and the center of the load bearing line 22 to show and define the load bearing axis 62 of the hook and safety gate combination. The safety gate and hoisting hook are so designed that the pivot point of the gate in the hook eye is horizontally displaced from the load axis line 62 towards the tip 12 and throat 19 of the hook. A vertical construction line 64 passes through this pivot point axis. The weight of the load on the hook tends to move the pivot point into alignment with the load axis causing the safety gate to rotate to closed position with respect to the hook. The pivot point is prevented from coming into line with the load axis by the end segment 26 of the safety gate contacting the tip 12 of the hook so that the loaded hook will always tend to maintain the closed position of the safety gate with respect to the hook. Load weight on the hook does not cause pressure to bear on the latch, as the latch is allowed to rest without pressure on shoulder 36. However, accidental pressure tending to separate the end segments of the bridging arm portion of the safety gate from the tip of the hook, as when the hook is unloaded, will bring pressure to bear on the latch and the bridging arm will not leave the hook tip and accidental loss of the load bearing line is prevented.

Referring to FIGS. 5, 6, and 7, the safety gate and hoisting hook combination is illustrated in a second mode of operation in which a plate or sheet of material 66 is lifted using a plurality of units to grip the plate in four places. With loads such as plate material, beams or pipes, on which there are no loops for hook attachment, the hook is slipped over an edge of the material being hoisted. As best shown in FIG. 6, one of the hooks illustrated in FIG. 5 receives a relatively thick plate 66 filling essentially the entire throat opening 19 of the hook 10. As the load is lifted with lifting force being directed upwardly and inwardly on the hoisting line 60, the plate will be seated deep within the hook, contacting the body portion 14, and will be supported by the tip 12 of the hook. Because of lifting force applied to the hoisting line 60, the connecting arm 56 of the safety gate acts as a lever forcing the end segment 26 of the safety plate into firm, frictional engagement with the upper surface of the plate 66, so that the plate is gripped between the gate and the hook. The hook and gate combination will work as well with thinner materials or with a more generally vertical lift than that shown in the figures.

The embodiments of the invention in which an exclusive property or privilege is claimed are defined as follows:

1. In a safety hook, the combination with:
a hoisting hook having a curved, load engaging, uniplanar, body portion extending to a tip at a first end thereof and through a relatively straight shank segment to a hook eye at a second end thereof, said eye lying in the plane of the body portion, and said hook having an open throat between said tip and said eye;
a one piece safety gate having parallel side plates removably pivotally mounted through said hook eye, said gate including a connecting arm and a gate arm, each integral with and extending outwardly from said side plates in obtuse angular relation to each other;
said gate being rotatable concentric with said eye opening between a first position wherein said gate arm is positioned across said throat and in contact with said tip and a second position wherein said gate arm lies in clearing relation to access to said hook throat, an edge of said gate arm adjacent the hook throat when the gate is in said first position being in approximate alignment with an interior edge of said shank segment when said gate is in said second position;
said connecting arm being provided with an eye for receiving a hoisting line, and the curved body portion of the hoisting hook being adapted to receive a load bearing line, the relationship of the parts being such that when the safety hook is supported on a hoisting line and supports a load line and the gate is in said first position, the axis of the hook eye will lie in offset relation to a load bearing axis extending between said lines, said offset being in direction toward said hook tip; and
releasable latch means operative when said safety gate reaches said first position to lock it in said position.

2. The structure of claim 1 wherein said hook eye is provided with integral latch engaging means; wherein said gate arm is provided with a latch receiving cavity extending transversely therethrough but lying in said hook plane; and wherein said latch means includes a latch resiliently urged into contacting, locking relation with said latch engaging means when said gate reaches said first position, said latch including a latch actuating arm lying entirely within said gate arm when in latching position and accessible through said latch receiving cavity for manual actuation against said resilient means to move said latch into spaced relation with respect to said latch engaging means.

3. The combination of claim 2 wherein the dimension of the gate arm measured in the plane of the hook body in direction transverse to the throat opening is roughly the same as the dimension of the throat opening from the hook eye to the tip; and wherein outer surfaces of the safety gate are in such smooth flowing form as to make it impossible for a hoisting line, a load line and any other rigging to hang up on the gate as the safety hook is moved between load handling and rest condition.

4. The structure of claim 2 in which said latch engaging means is a shoulder formed in a widened eye portion of the hook and facing generally across and in the direction of the throat of the hook, and in which the latch is pivoted to the gate arm and includes a hook engaging corner portion adapted to contact said shoulder to latch said gate in said first position.

* * * * *